(12) United States Patent
Papakyriacou et al.

(10) Patent No.: US 9,820,023 B2
(45) Date of Patent: *Nov. 14, 2017

(54) LOUDSPEAKER SYSTEM WITH IMPROVED SOUND

(71) Applicants: Sound Solutions International Co., Ltd., Beijing (CN); Nautilus Capital Corporation, Wilmington, DE (US)

(72) Inventors: Maria Papakyriacou, Vienna (AT); Johannes Kobler, Munich (DE); Jürgen Sauer, Munich (DE)

(73) Assignees: Sound Solutions International Co., Ltd, Beijing (CN); Nautilus Capital Corporation, Wilmington, DE (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/729,918

(22) Filed: Jun. 3, 2015

(65) Prior Publication Data

US 2015/0314263 A1 Nov. 5, 2015

Related U.S. Application Data

(63) Continuation of application No. 13/818,374, filed as application No. PCT/IB2011/053685 on Aug. 23, 2011.

(30) Foreign Application Priority Data

Aug. 23, 2010 (EP) .................................... 10173765

(51) Int. Cl.
*H04R 1/00* (2006.01)
*C01B 39/46* (2006.01)
(Continued)

(52) U.S. Cl.
CPC .............. *H04R 1/00* (2013.01); *B01J 20/165* (2013.01); *B01J 20/18* (2013.01); *B01J 20/183* (2013.01); *B01J 20/186* (2013.01); *B01J 20/261* (2013.01); *B01J 20/264* (2013.01); *B01J 20/2803* (2013.01); *B01J 20/28004* (2013.01); *B01J 20/2808* (2013.01); *B01J 20/28016* (2013.01); *B01J 20/28078* (2013.01); *B01J 20/28083* (2013.01); *B01J 20/28085* (2013.01); *B01J 20/28088* (2013.01); *B01J 20/28092* (2013.01); *C01B 39/38* (2013.01); *C01B 39/44* (2013.01); *C01B 39/46* (2013.01); *H04R 1/02* (2013.01); *H04R 1/2803* (2013.01); *H04R 1/288* (2013.01); *H04R 1/2811* (2013.01); *B01J 2220/66* (2013.01); *H04R 1/28* (2013.01); *Y10T 428/2982* (2015.01)

(58) Field of Classification Search
USPC .................................................. 381/354, 337
See application file for complete search history.

(56) References Cited

U.S. PATENT DOCUMENTS

2006/0269095 A1* 11/2006 Matsumura .......... H04R 1/2803
381/421

* cited by examiner

*Primary Examiner* — Amir Etesam
(74) *Attorney, Agent, or Firm* — Steven McMahon Zeller; Dykema Gossett PLLC (57) ABSTRACT

A loudspeaker device is presented which includes a zeolite material comprising zeolite particles having a silicon to aluminum mass ratio of at least 200. For an increased pore fraction of pores with a diameter in a range between 0.7 micrometer and 30 micrometer shows an increased shift of the resonance frequency down to lower frequencies has been observed.

33 Claims, 8 Drawing Sheets (51) Int. Cl.
  *B01J 20/28* (2006.01)
  *B01J 20/18* (2006.01)
  *B01J 20/26* (2006.01)
  *C01B 39/38* (2006.01)
  *C01B 39/44* (2006.01)
  *B01J 20/16* (2006.01)
  *H04R 1/02* (2006.01)
  *H04R 1/28* (2006.01)

LOUDSPEAKER SYSTEM WITH IMPROVED SOUND

CROSS REFERENCE TO RELATED APPLICATIONS

This application is a continuation of U.S. application Ser. No. 13/818,374, filed Feb. 23, 2013, which is a national stage of PCT/IB2011/053685, filed Aug. 23, 2011, which claims priority to European Patent Application No. 10173765.8 filed Aug. 23, 2010, the disclosures of which are incorporated in their entirety by reference herein.

FIELD OF INVENTION

The present invention relates to the field of loudspeaker devices.

ART BACKGROUND

In loudspeaker devices, including a loudspeaker, a housing and a resonance space, gas adsorbing materials—in the following referred to as sorber—like e.g. activated carbon or zeolite may be placed therein to improve sound generation of the loudspeaker device. A sorber in the resonance space of the loudspeaker leads to an apparent virtual enlargement of the resonance space by gas adsorption and desorption. The resonance frequency of the loudspeaker device is thereby lowered to a value that can be achieved without sorber only with an essentially larger resonance space.

However, it turned out that the use of sorbers bears several problems. One problem is the aging of the sorber in particular by irreversible adsorption of substances with high vapour pressure.

EP 2 003 924 A1 relates to a loudspeaker system in which a gas adsorber, obtained by adding a binder to a porous material including a plurality of grains so as to perform moulding, is used to physically adsorb a gas in a closed space of the speaker system. The porous material may be made of one selected from the group consisting of an activated carbon, zeolite, silica ($SiO_2$), alumina ($Al_2O_3$), zirconia ($ZrO_3$), magnesia (MgO), iron oxide black ($Fe_3O_4$) molecular sieve, fullerene and a carbon nanotube. The binder may be one of a powdery resin material and a fibrous resin material.

In view of the above-described situation, there exists a need for an improved technique that enables to increase the virtual acoustic volume of a resonance space of a loudspeaker device while substantially avoiding or at least reducing one or more of the above-identified problems.

SUMMARY OF THE INVENTION

This need may be met by the subject matter according to the independent claims. Advantageous embodiments of the herein disclosed subject matter are described by the dependent claims.

According to a first aspect of the invention there is provided loudspeaker device comprising a loudspeaker receptacle for receiving a loudspeaker, and a zeolite material comprising zeolite particles having a silicon to aluminum mass ratio of at least 200. According to embodiments, the zeolite material comprises zeolite particles in pure $SiO_2$ modification. It should be noted that herein the term "silicon to aluminum mass ratio of at least 200" includes higher silicon to aluminum mass ratios, e.g. 250 or 300, as well as aluminum-free zeolite particles. In the latter case, the whole zeolite particles of the zeolite material are in pure $SiO_2$ modification.

The experiments performed by the inventors showed that such zeolite particles may provide a good sorption capacity per volume unit and a slow aging behavior. Zeolites are microporous minerals, usually aluminosilicate minerals, and are known to a person skilled in the art. Basic information about zeolites is available from the International Zeolite Association and the corresponding web site (http://www.iza-online.org/).

Generally herein a loudspeaker refers to any type of electro-acoustic transducer.

According to an embodiment of the first aspect, at least part of the zeolite particles have the structure FER. According to a further embodiment, at least part of the zeolite particles have the structure MFI. According to an embodiment, all of the zeolite particles are of the same structure, e.g. the structure FER. According to other embodiments, the zeolite material includes zeolite particles of at least two different structures. For example, in an embodiment, the zeolite material includes zeolite particles of the structure FER and zeolite particles of the structure MFI. Herein the three letter code relates to the classification of zeolites according to the International Zeolite Association and can be obtained inter alia from http://www.iza-online.org/.

According to a further embodiment, the zeolite material further comprises a binder adhering the individual zeolite particles together. This allows grains of zeolite material to be formed which are larger than a single zeolite particle. Further a certain spacing between zeolite particles can be established by the binder and appropriate processing of the ingredients of the zeolite material.

According to a further embodiment, the zeolite particles comprise first pores having a diameter in a first diameter range and the zeolite material comprises second pores between different zeolite particles. The size of first pores in the zeolite particles usually have a sharp pore diameter distribution. The diameter of the second pores can be influenced by the manufacturing process of the zeolite material.

According to an embodiment, the second pores have a diameter in a second diameter range and the second diameter range is spaced from the first diameter range by at least one order of magnitude. For example, if the first diameter range extends up to about 4 nanometers, according to an embodiment the second diameter range of the second pores extends from about 40 nanometers to higher diameters.

According to a further embodiment, the second pores have a pore diameter larger than 50 nanometer.

According to a still further embodiment, the zeolite material has second pores in the range between 0.7 micrometer and 30 micrometer. According to a further embodiment, the zeolite material has second pores in the range between 1 micrometer and 10 micrometer.

According to an embodiment of the first aspect, the second pores have a pore diameter distribution with a local peak in a diameter range between 0.7 micrometer and 30 micrometer. According to an further embodiment, the second pores have a pore diameter distribution with a local peak in a diameter range between 1 micrometer and 10 micrometer.

According to a further embodiment, the zeolite material comprises grains having a plurality of the zeolite particles adhered together with the binder and the grains have an average grain size in a range between 0.2 millimeter and 0.9 millimeter.

According to a further embodiment, in relation to the whole mass of the zeolite material the mass fraction of the binder is in the range from 1% to 20%. According to a further embodiment, in relation to the whole mass of the zeolite material the mass fraction of the binder is in the range from 2% to 10%. According to a further embodiment, in relation to the whole mass of the zeolite material the mass fraction of the binder is in the range from 4% to 6%.

According to an embodiment, the zeolite particles have a mean diameter below 10 micrometer. According to a further embodiment, the zeolite particles have a mean diameter below 5 micrometer. According to a further embodiment, the zeolite particles have a mean diameter below 2 micrometer.

According to an embodiment, the zeolite particles have a mean diameter above 0.1 micrometer. According to a further embodiment, the zeolite particles have a mean diameter above 0.3 micrometer, or, according to still other embodiments, above 0.5 micrometer.

According to a second aspect, a zeolite material is provided, the zeolite material being obtainable by: (i) preparing a zeolite suspension from zeolite particles having a silicon to aluminum mass ratio of at least 200 and an nonpolar solvent; (ii) mixing the zeolite suspension with a binder suspension to obtain a zeolite-binder mixture; and (iii) drying the zeolite-binder mixture. According to embodiments of the second aspect, the zeolite material is configured or processed as described with regard to the first aspect or embodiments and examples thereof.

According to embodiments of the herein disclosed subject matter, a zeolite material is obtained by (a) preparing a zeolite suspension with an organic solvent, e.g. alcohol, wherein the zeolite particles have a mean particle diameter smaller than 10 micrometer or, according to another embodiment, smaller than 2 micrometer. (b) The zeolite suspension is homogenized, e.g. by stirring. (c) The homogenized zeolite suspension is mixed with a binder suspension, e.g. a latex suspension. Embodiments of Latex suspensions include at least one of a Polyacrylate suspension, Polystyrolacetat suspension, Polyvinylacetat suspension, Polyethylvinylacetat suspension, Polybutadienrubber suspension, etc. According to an embodiment, the mass concentration of the binder, e.g. the polymer, is between 1 weight % and 10 weight %, or, according other embodiments, between 4 weight % and 6 weight %. The resultant suspension is then dried. Drying can be performed in different ways, e.g. by means of a fluidized bed, a spray method or by pouring the resultant suspension onto a hot plate (according to embodiments the temperature of the plate is in a range between 120 degrees Celsius and 200 degrees Celsius or between 150 degrees Celsius and 170 degrees Celsius). If the grains of the resultant solid are larger than desired, the resultant solid may be cut or broken into smaller pieces e.g. by means of a mortar mill, a hammer rotor mill, a cutting mill or a oscillating plate mill. (d) Subsequently, the resultant solid (optionally cut or broken) is screened with sieves to obtain grains in a desired diameter range.

According to a third aspect, a method of producing a zeolite material for use as a sorber material in loudspeaker device is provided, the method comprising (i) preparing a zeolite suspension from zeolite particles having a silicon to aluminum mass ratio of at least 200 and a solvent that includes an organic solvent; (ii) mixing the zeolite suspension with a binder suspension to obtain a zeolite-binder mixture; and (iii) drying the zeolite-binder mixture. According to embodiments of the third aspect, the zeolite material is configured or processed as described with regard to the first aspect or embodiments and examples thereof.

According to an embodiment, the solvent consists of at least one organic solvent. According to a further embodiment, the solvent comprises at least one organic solvent and at least one inorganic solvent.

According to a fourth aspect, there is provided a use of a zeolite material having zeolite particles with a silicon to aluminum mass ratio of at least 200 in a loudspeaker device region that is exposed to sound generated by a loudspeaker of the loudspeaker device. According to embodiments of the fourth aspect, the zeolite material is configured or processed as described with regard to the first aspect or embodiments and examples thereof.

In the above there have been described and in the following there will be described exemplary embodiments of the subject matter disclosed herein with reference to a loudspeaker device, a zeolite material, a method of producing a zeolite material and a use of a zeolite material. It has to be pointed out that of course any combination of features relating to different aspects of the herein disclosed subject matter is also possible. For example, some embodiments have been described with reference to apparatus type claims whereas other embodiments have been described with reference to method type claims. However, a person skilled in the art will gather from the above and the following description that, unless otherwise notified, in addition to any combination of features belonging to one aspect also any combination between features relating to different aspects or embodiments, for example even between features of the apparatus type claims and features of the method type claims, is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

The illustration in the drawings is schematic. It is noted that in different figures, similar or identical elements are provided with the same reference signs or with reference signs, which are different from the corresponding reference signs only within the first digit.

In the following, the measurement methods employed to determine the experimental results which are presented herein are described.

Room Temperature Nitrogen Sorption Measurements

Nitrogen adsorption isotherms have been determined at 25 degrees Celsius (° C.) between 25 millibar (mbar) and 1100 mbar with a sorption measurement device "Nova 1000e" of the firm "Quantachrome". Further technical information is available from the technical datasheets of the firm "Quantachrome", e.g. in the section "A Method for the Determination of Ambient Temperature Adsorption of Gases on Porous Materials" in Powder Tech Note 19.

Measurement of the Electrical Impedance

Figure 1:
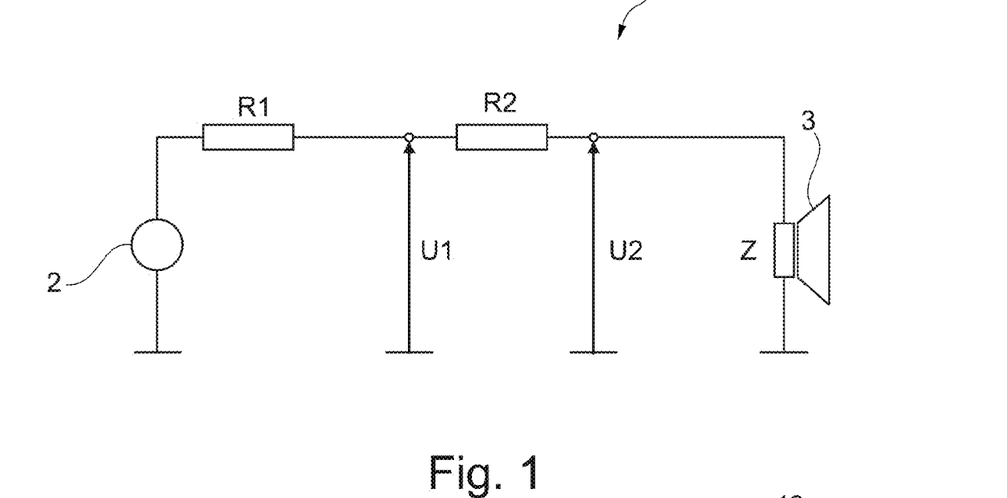
FIG. 1 schematically shows a measurement circuit for impedance measurements.

The measurement of the loudspeaker impedance is based on the circuit 30 shown in FIG. 1. A reference resistance R2 is connected between an exciting signal source 2 and a loudspeaker 3. R1 denotes the ohmic resistance of the supply lines 1.

The electrical impedance is frequency dependent. After measurement of the voltages U1 and U2 as a function of frequency f, i.e. U1(f) and U2(f), the impedance Z is calculated according to the following equation:

$$Z(f) = \frac{U2(f)}{U2(f) - U1(f)} R2$$

Figure 2:
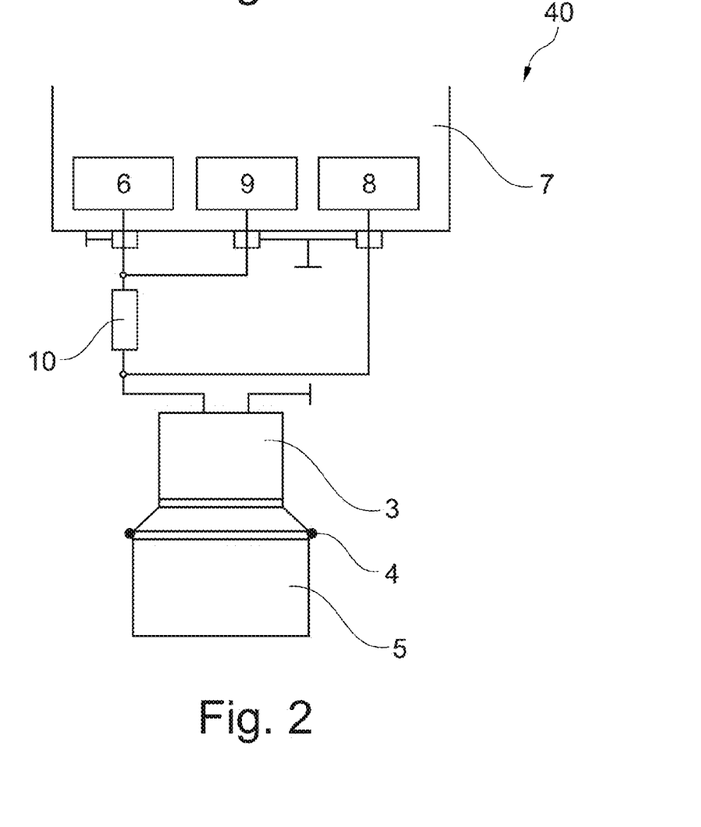
FIG. 2 schematically shows a measurement circuit for measuring the impedance response of a loudspeaker device.

The measurement circuit 40 for determining the impedance response shown in FIG. 2 comprises a loudspeaker of the type NXP RA11×15×3.5, serial No. 0001A5 9205E 11141345, indicated at 3 in FIG. 2, which has been mounted hermetically sealed with a sealing 4 over a closed volume 5 (ca. 500 mm$^3$, 12.5 mm×9.5 mm×4.2 mm). The closed volume 5 forms a resonance space for the loudspeaker. The resonance frequency with the resonance space being empty is 1000 Hz. In an exemplary embodiment, the exciting signal was generated by a computer soundcard 7 wherein the exciting signal is provided to the loudspeaker via an audio output port 6 of the computer soundcard 7. The left line output port 6 serves to output the test signal, the left line input port 8 serves for acquisition of a device under test (DUT) signal and the right line input port 9 serves as a reference input port. The resistance 10 serves for damping the test signal.

By a resonance effect there is generated an amplification of the test signal, wherein the amplification depends on the volume of the resonance space. If the volume of the resonance space is empty, there is a certain amplification of the test signal at a certain frequency. By reducing the volume, the amplification shifts towards higher frequencies. By enlargement of the volume or by placing a suitable zeolite material in the resonance space the maximum of the amplification can be shifted to lower frequencies.

Sound Pressure Level Measurements

Figure 3:
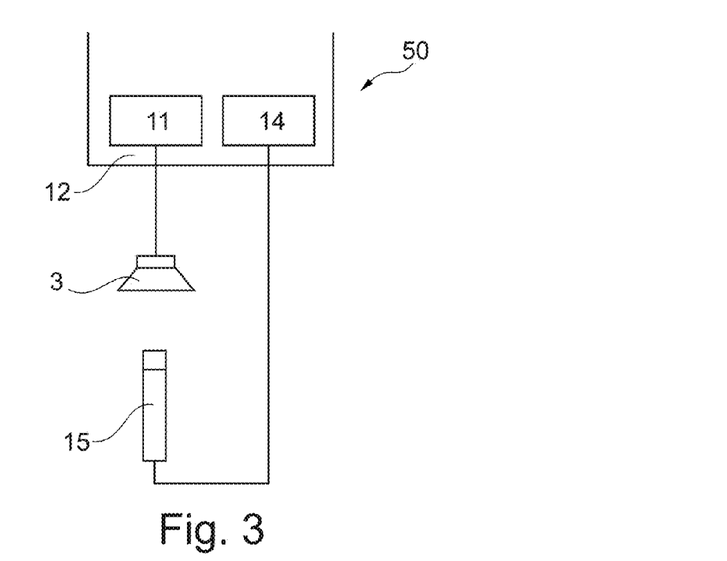
FIG. 3 schematically shows a measurement circuit for sound pressure level measurements.

FIG. 3 schematically shows the experimental setup 50 for the sound pressure level measurements. The left output port 11 of the soundcard 12 is used as a signal source for the loudspeaker 3. The left input 14 of the soundcard is used for recording the output voltage of a microphone 15.

For evaluation of the measurement data the programs "Arta" and "Limp" have been used. Further details on the evaluation and the experimental setup can be taken from the users guide of the programs "Arta" and "Limp". The users guides are available under http://www.fesb.hr/~mateljan/arta/.

Results and Description of Embodiments

According to the findings of the inventors, the prior art does not provide a loudspeaker system with an aging resistant, well functioning adsorber with a low acoustic resistance. For example, activated carbon can be used as gas adsorbing material, however there are a plurality of problems. Activated carbon is electrically conducting and can interfere with the electromagnetic transducers of the loudspeaker or other electronic parts within or external to the loudspeakers. Interaction with the surrounding equipment generated by induction of currents in the electrically conducting material are usually undesirable. For example, if an antenna is placed close to the electrically conducting material, the transmit power of the antenna is reduced.

Further, the use of carbon-based materials can lead to further problems. For example, it has been observed by the inventors that the chemically reactive activated carbon can react with metal parts of the loudspeaker housing leading to corrosion. Another severe problem with the use of activated carbon is the occurrence of short circuits by aberration of the activated carbon.

No electrically non-conducting sorption material is known which results in a virtual acoustic enlargement of the volume of the resonance space by at least a factor of 2 for resonance frequencies of larger 500 Hz. By an enlargement of the virtual acoustic volume by the factor of 2, resonance shifts to lower frequencies of over 150 Hz can be achieved with known miniature loudspeaker systems. For achieving a high virtual enlargement of the resonance space a high sorption capacity for nitrogen as a main portion of air and a high sorption coefficient (dn/dp) at 10$^5$ Pa is important in order to allow a large volume of gas to adsorb on or desorb from the sorption material when pressure variations occur. Herein "n" denotes the adsorbed amount of gas and "p" denotes the pressure of the gas.

For a good sorption capacity the surface of the sorber should be as large as possible since the gas molecules adsorb primarily on the surface. However, other parameters such as morphology, chemical structure, curvature of the surface, etc. is important for the sorption capacity of the material. However, an exact correlation between the above properties of a substance and its sorption properties is unknown, at least for gases at temperatures above their critical temperature Tc. This is the case for Oxygen and Nitrogen at ambient temperature, since Tc(N$_2$)=126 K and Tc(O$_2$)=155 K. Since the volume that is available for the sorber is limited, a criterion for suitability of the sorber for virtual acoustic volume enlargement is the sorption capacity per volume unit. Hence, the sorption capacity per mass unit are only of limited interest.

According to the findings of the inventors, a sorber with intrinsically non-porous material and low particle size is unsuitable for achieving a virtual acoustic enlargement of a resonance space. Such a material is dried colloidal $SiO_2$ with a particle size of about 9 nm. For such a particle size, the binder particles should be of the same size because otherwise the amount of sorber particles per volume unit and hence the adsorbing surface per volume unit would decrease to a large extent. However, a distance between sorber particles in nanometer range results in an undesired high acoustic resistance for the sorber.

For materials with a large internal surface, i.e. for intrinsically porous materials such as zeolites, larger particles can be used for building the sorber.

Zeolites are typically synthesized in particle sizes up to 10 μm. If these particles are glued to each other in a simple manner, the resulting acoustic resistance is too high due to low distances between the particles.

One problem with zeolite particles with a diameter over 10 μm is the accessibility of the inner regions of these particles. Since the time span for the respective adsorption and desorption process is within a few milliseconds, the path to the adsorption location should be as short as possible which is not realized for particles greater 10 μm. Hence, in comparison to smaller particles there is only a limited increase of the virtual acoustic volume of the resonance space filled with such particles.

Figure 4:
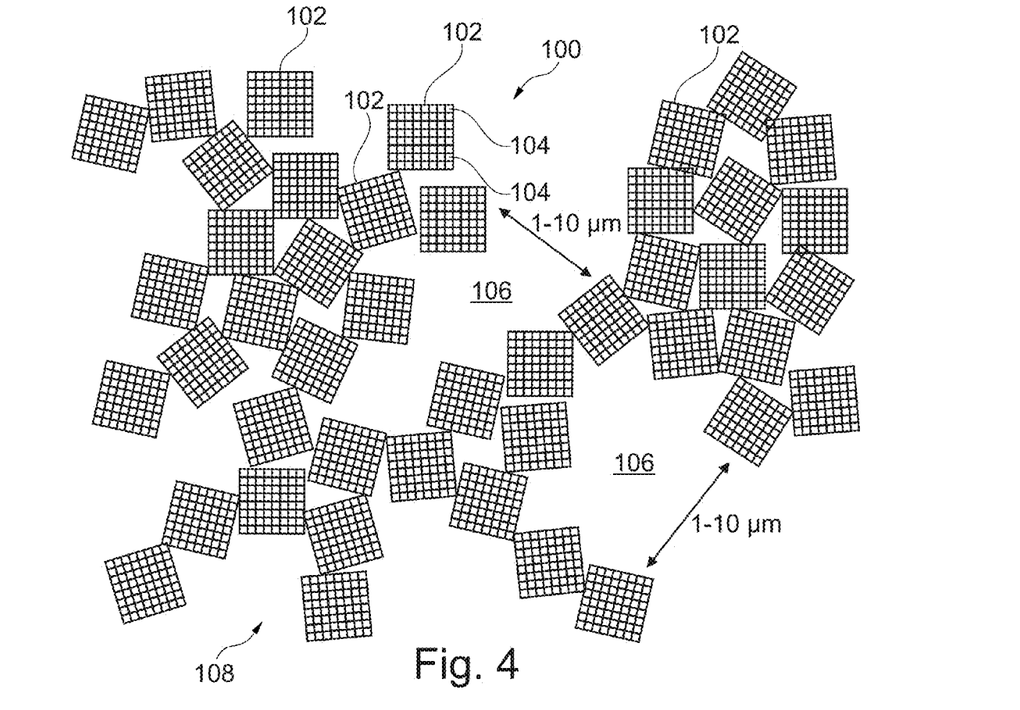
FIG. 4 schematically shows a grain of a zeolite material in accordance with embodiments of the herein disclosed subject matter.

FIG. 4 shows a zeolite material 100 in accordance with embodiments of the herein disclosed subject matter. The zeolite material 100 comprises zeolite particles, some of which are denoted by 102 in FIG. 4. The zeolite particles have internal, first pores 104, indicated by the structure shown within the individual zeolite particles shown in FIG. 4.

The zeolite particles are adhered together with a binder (not shown in FIG. 4). In accordance with an embodiment of the herein disclosed subject matter, second pores 106 are formed between the zeolite particles 102. In an exemplary embodiment the second pores 106 have a diameter of about 1 to 10 micrometer, as indicated in FIG. 4. Due to the binder, the individual particles 102 in FIG. 4 are adhered together to form a grain 108.

It should further be mentioned that although the zeolite particles 102 are drawn with a rectangular shape in FIG. 4, the real zeolite particles may have a different form which depends on the actual structure of the zeolite particles.

Figure 5:
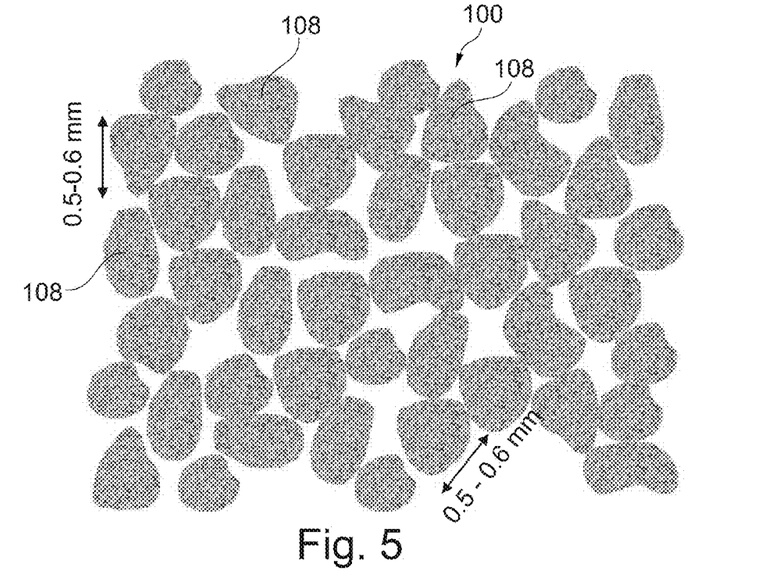
FIG. 5 schematically shows a zeolite material in accordance with embodiments of the herein disclosed subject matter.

FIG. 5 shows a plurality of grains 108 of the type shown in FIG. 4. As indicated in FIG. 5, the diameter of the grains 108 is about 0.5 mm to 0.6 mm in an embodiment.

By extensive experiments the inventors found that good sorbing characteristics can be obtained with a zeolite of the structure type FER or MFI. In the experiments it turned out that zeolites with a high silicon to aluminium mass ratio are advantageous regarding the adsorption/desorption requirements. This may be due to an increased hydrophobicity of these zeolites such that generally possible concurrent water adsorption processes take place only to a limited extent.

Zeolite structures which can be synthesized in the form of pure $SiO_2$ or almost pure $SiO_2$ are for example the types DDR, FER, MFI or BEA. The three letter code relates to the classification of zeolites according to the International Zeolite Association and can be obtained inter alia from http://www.iza-online.org/. The code orders the zeolite according to their atomic structure. A zeolite in the form of at least pure $SiO_2$ is characterized by a very low aluminium content, i.e. by a silicon to aluminium mass ratio over 200.

Figure 6:
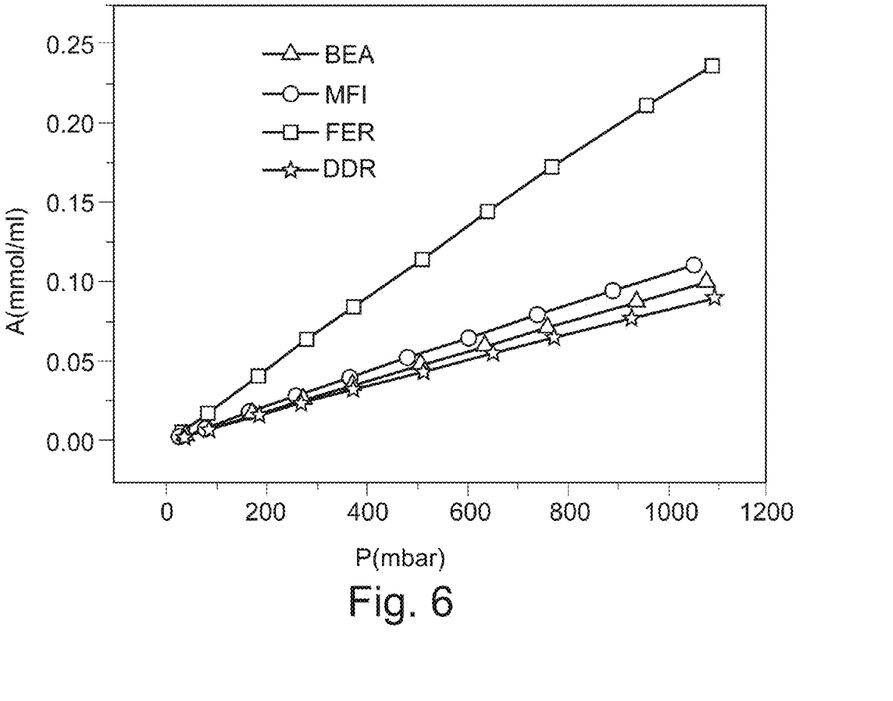
FIG. 6 shows nitrogen adsorption isotherms for zeolites in accordance with embodiments of the herein disclosed subject matter.

By extensive measurements it was found that the zeolite type FER has the highest sorption capacity for nitrogen at room temperature among the investigated zeolites. Details of the experimental results are shown in FIG. 6 where the amount of adsorbed gas (nitrogen) A in millimol per milliliter (mmol/ml) is shown over the pressure p in millibar (mbar) for the zeolite types BEA, MFI, FER and DDR. For measurement of the adsorption capacity, the pure silicon zeolites in powder form have been activated for 1 h at 500 degrees Celsius. Activation was performed to remove any possible residuals from the zeolite. The volume of zeolite was determined by measuring the mass of the zeolite and dividing the mass by the cristallographically determined density of the zeolite which is also known to the skilled person.

Figure 7:
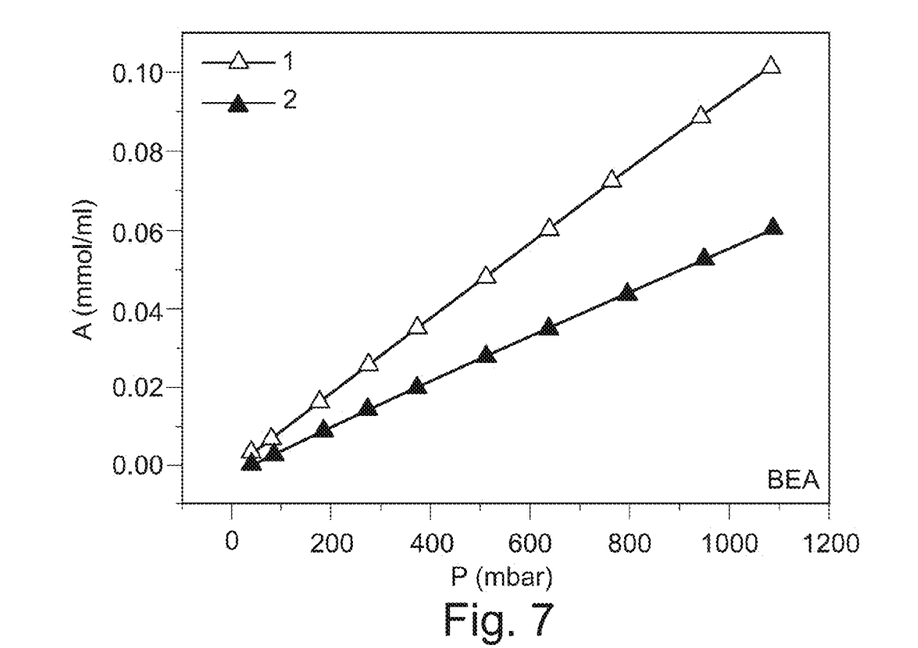
FIG. 7 shows nitrogen adsorption isotherms for BEA zeolites before and after aging.
Figure 8:
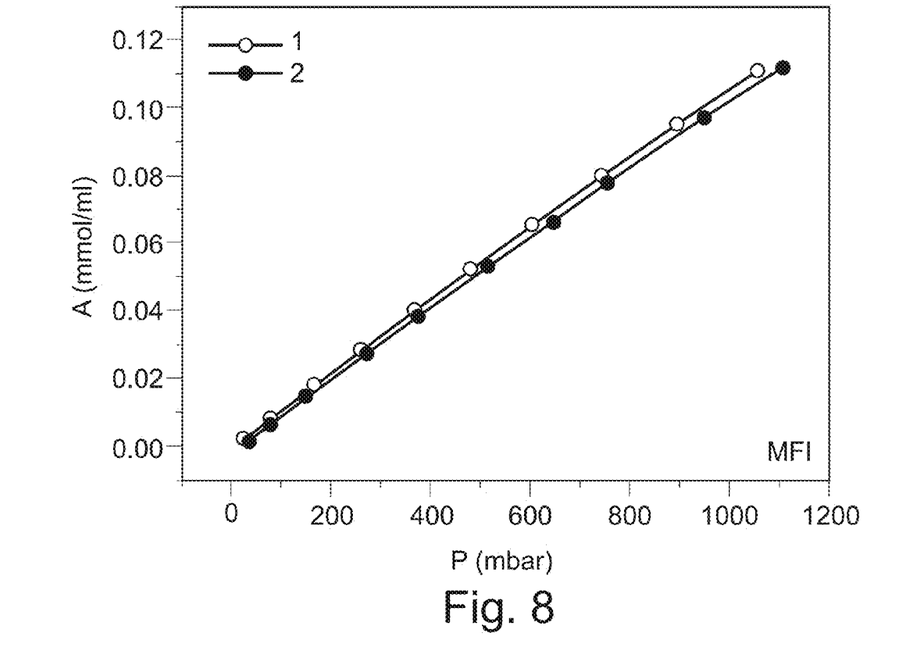
FIG. 8 shows nitrogen adsorption isotherms for MFI zeolites before and after aging.
Figure 9:
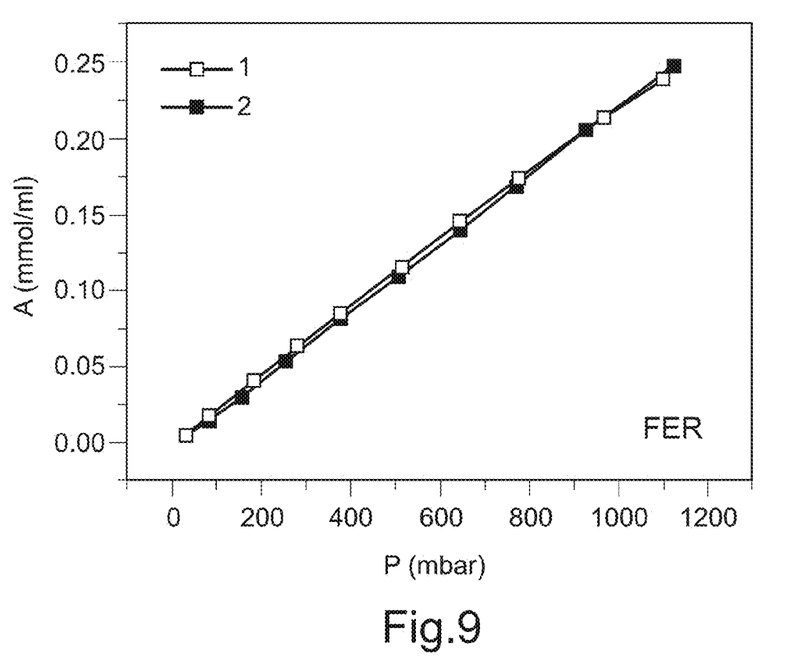
FIG. 9 shows nitrogen adsorption isotherms for FER zeolites before and after aging.

To determine the aging behaviour of the investigated zeolites, nitrogen adsorption isotherms (amount of adsorbed gas A in mmol/ml over pressure p in mbar) have been determined after activation (curve 1) and after aging for one week at ambient air under normal conditions (curve 2).

The results are shown in FIG. 7 for the zeolite type BEA, in FIG. 8 for the zeolite type MFI and in FIG. 9 for the zeolite type FER.

To summarize the above findings, among the zeolites under consideration in pure $SiO_2$ modification, the structure type ferrierit (FER) has the highest sorption capacity for nitrogen per volume unit at normal pressure and, in contrast to the zeolite type BEA in its almost pure $SiO_2$ modification, does not age. Up to now there is no explanation for this surprising experimental result. Although it is known to the skilled person that zeolites can adsorb different substances and that adsorption of substances of high vapour pressure can lead to an obstruction of the pores and hence to a reduction of the sorption capacity of small molecules, it is not clear why the substances which are adsorbed by zeolite BEA apparently lead to an irreversible reduction of the sorption capacity and why this effect does not occur with the zeolite FER. With the zeolite type MFI only negligible aging processes occur due to environmental influences which lead to a likewise negligible reduction of the sorption capacity in the loudspeaker device. Hence, the zeolite MFI in its aging behaviour is comparable to the zeolite type FER.

Hence, zeolite type FER is a promising candidate for the application as a sorber material in a loudspeaker device in accordance with the herein disclosed subject-matter. However, it should be understood that also other types of zeolites can be used for providing a zeolite material according to the herein disclosed subject matter.

In a comparison of the pore diameters of the intrinsic pores of the zeolites under investigation, it was found that the diameters of the intrinsic pores of the zeolites BEA, MFI, FER, DDR fall continuously in the order from 0.7 nm to 0.4 nm. From the experiments it appears advantageous to use zeolites with a small intrinsic pore diameter, wherein the lower boundary for the intrinsic pore diameter is given by the size of the nitrogen molecule which is about 0.4 nm. However, up to now there is no explanation for the bad performance of the DDR zeolite with the pore diameter of 0.44 nm×0.36 nm which should provide a good accessibility for nitrogen.

Generally it is possible that other zeolite types which can be produced in a hydrophobic form are as well suitable for providing a zeolite material according to the herein disclosed subject matter. For example, the zeolite types CHA, IHW, IWV, ITE, UTL, VET, MTW can also be produced as pure or doped $SiO_2$ modifications and have hydrophobic properties. Doping can be performed with, for example, elements of the fourth group of the periodic table, e.g. with germanium.

From the experiments it was found that the particle size of the primary particles of the zeolite is advantageously below 10 μm. According to an embodiment of the herein disclosed subject-matter, the diameter of the primary particles is below 5 μm. According to a further embodiment, the diameter of the primary particles is below 2 μm. According to a further embodiment, the diameter of the primary particles is larger than 300 nm.

Figure 10:
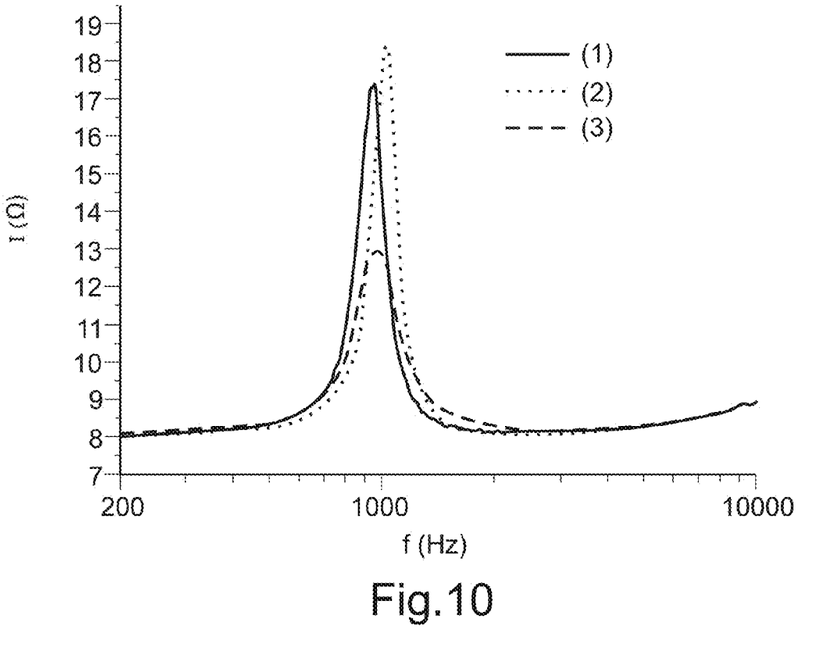
FIG. 10 shows electrical impedance curves for zeolites in accordance with embodiments of the herein disclosed subject matter.

It was shown by comparison measurements that a diameter of the primary particles larger than 10 μm is detrimental for the enlargement of the virtual acoustic volume of the resonance space of the loudspeaker device. FIG. 10 exemplarily shows measurements of the electric impedance I in Ohm (Ω) over frequency f in Hertz (Hz) of a loudspeaker device with FER zeolite in powder application with different diameters of the primary particles. To this end, the electric impedance curves of a loudspeaker device with an empty resonance space and with the resonance space filled with FER zeolite in pure $SiO_2$ modification was measured for two different particles sizes. The applied mass of zeolite was 60 mg in each case. The results are shown in FIG. 10. Curve (1) shows the impedance of the loudspeaker device with FER zeolite with a diameter of 5 μm. Curve (2) of FIG. 10 corresponds to the empty resonance space and curve (3) corresponds to the resonance space filled with FER zeolites with a diameter of the primary particles of about 100 μm. Since the zeolite was applied in powder form no more zeolite could be applied in the resonance space of the loudspeaker without considerable damping. From FIG. 10 it can be taken that for the primary particle diameter of 100 μm the obtained shift of the resonance maximum compared to the empty resonance space is lower than the shift of the resonance maximum for a diameter of the primary particles of 10 μm. Further, the full width at half maximum of the resonance peak is much larger for the larger primary particle size.

Figure 11:
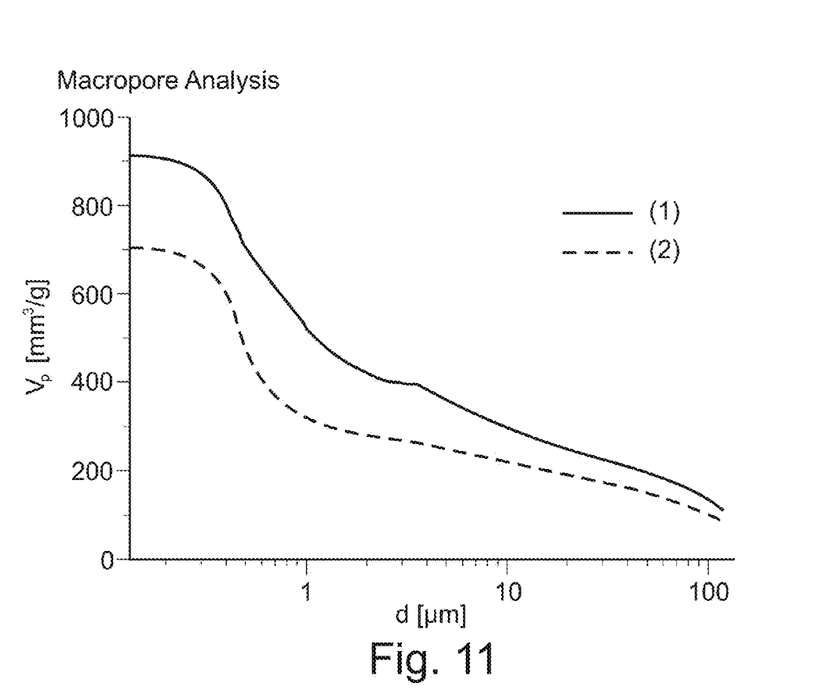
FIG. 11 shows cumulative pore volume curves for zeolites in accordance with embodiments of the herein disclosed subject matter.

From the experiments performed by the inventors it was found that for in presence of macropores with a pore diameter of larger than the intrinsic micropores of the zeolite the shift of the resonance peak is further increased and the damping is reduced compared to the same material without macropores. One experimental example (referred to hereinafter as a first method) how a large amount of these macropores can be obtained is to use 44 g calcinated zeolite MFI in pure $SiO_2$ modification and with a primary particle size of 1 μm (diameter) and disperse this zeolite in 96% ethanol. Then, a polyacrylate suspension is provided in an amount such that the concentration of the polyacrylate in the solid product is 5%. To this end, an initial, aqueous polyacrylate suspension was provided with a concentration of 11 weight % polyacrylate. The polyacrylate suspension at first has been doubled in its volume with 96% ethanol and has been then added to the zeolite suspension under extensive stirring. The resultant mixture was poured onto a plate of size 50×50 $cm^2$ and a temperature of 160 degrees Celsius within 3-4 seconds. The resultant solid was then broken up with a cutting mill and fractionated with analysis sieves. Of the thus obtained solid a cumulative pore distribution was determined by mercury porosimetry. The result is shown in FIG. 11, curve (1), where the cumulative pore volume Vp in cubic millimeter per gram ($mm^3/g$) is plotted over the pore diameter d in micrometer (μm). It should be noted that the cumulative pore volume means that the volume level is constant if no pore volume is present at a specific pore diameter. Hence a pore diameter distribution can be obtained from the first derivative of the cumulative pore volume (d(Vp)/d(d)).

Further, results of a comparison material according to embodiments of the herein disclosed subject matter are also shown in FIG. 11. The comparison material has been obtained from dispensing 44 g calcinated zeolite MFI in pure $SiO_2$ modification and a primary particle size of 1 μm in water. Subsequently, an aqueous polyacrylate suspension (11 weight % polyacrylate) was added such that a polymer portion related to the whole solid content was 5%. The mixture was homogenized with a stirring device and was dried under stirring with hot air. The resultant solid was broken with a cutting mill and fractionated with analysis sieves. The cumulative pore volume over pore diameter of this material which was also obtained by mercury porosimetry is shown as curve (2) in FIG. 11. From FIG. 11 it is apparent that the first method for preparation of the zeolite material leads to a considerable increase of the fraction of macropores with a diameter in the range of 1 μm-10 μm.

Figure 12:
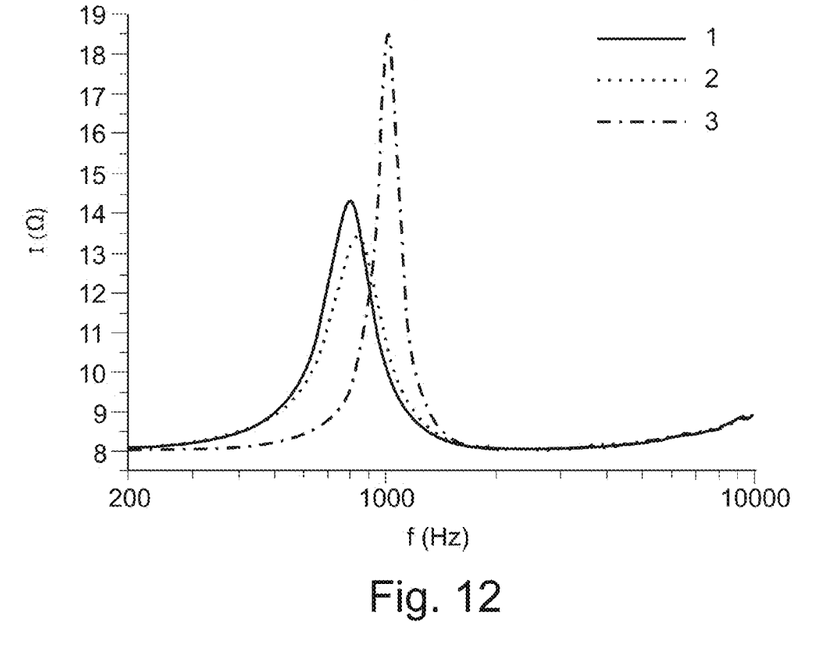
FIG. 12 shows electrical impedance curves for zeolite materials of FIG. 11 and for an empty resonance space.

FIG. 12 shows the electric impedance (I) measurements of both materials over frequency f, wherein curve (1) corresponds to the material with increased macropore fraction, curve (2) corresponds to the comparison material and curve (3) corresponds to the empty resonance space. The material with the increased macropore fraction leads to a higher resonance shift, a higher increase of the virtual acoustic volume, and, at the same time, to reduced damping.

Figure 13:
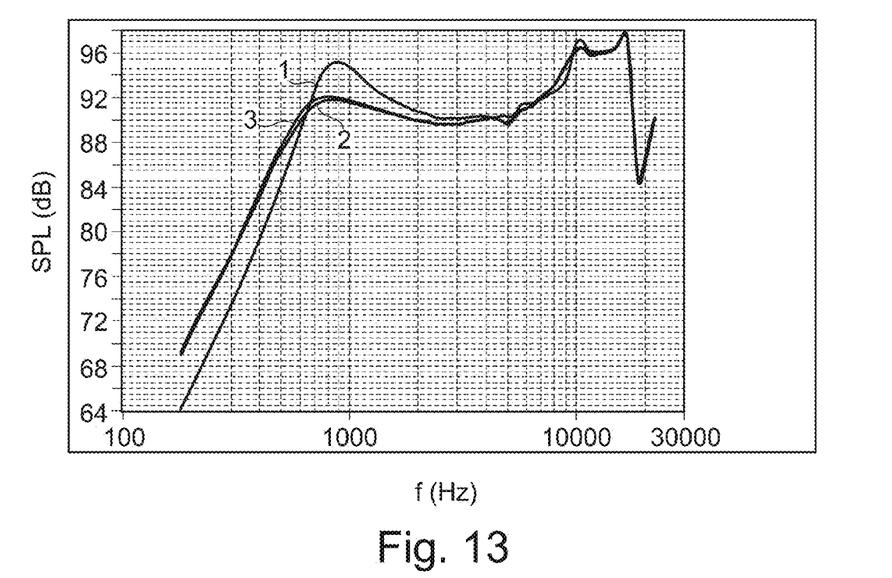
FIG. 13 shows sound pressure level measurements for a loudspeaker device in accordance with embodiments of the herein disclosed subject matter, for a loudspeaker device with empty resonance space and for a loudspeaker device having activated carbon fibers in its resonance space.

In FIG. 13 sound pressure level (SPL) over frequency f measurements are shown for a commercially available micro-loudspeaker device type NXP RA11×15×3.5, the back volume (resonance space) of which amounts to 1 $cm^2$. Line 1 shows the frequency response of the loudspeaker device with empty resonance space, line 2 shows the frequency response of this loudspeaker device with activated carbon fibre web in the resonance space and line 3 shows the frequency response of the same loudspeaker device with the zeolite material with increased macropore fraction in the resonance space. The resonance frequency shifts to the same extent by both materials, the activated carbon fibre web and the zeolite material with the increased macropore fraction, from 800 Hz down to 630 Hz. Also the damping of the two materials is comparable. Both materials are damping the loudspeaker to such a weak extent that the original sound pressure level of about 90 dB is maintained. However, the zeolite material with the increased macropore fraction is an electrically non-conducting material and is not subjected to aging.

Figure 14:
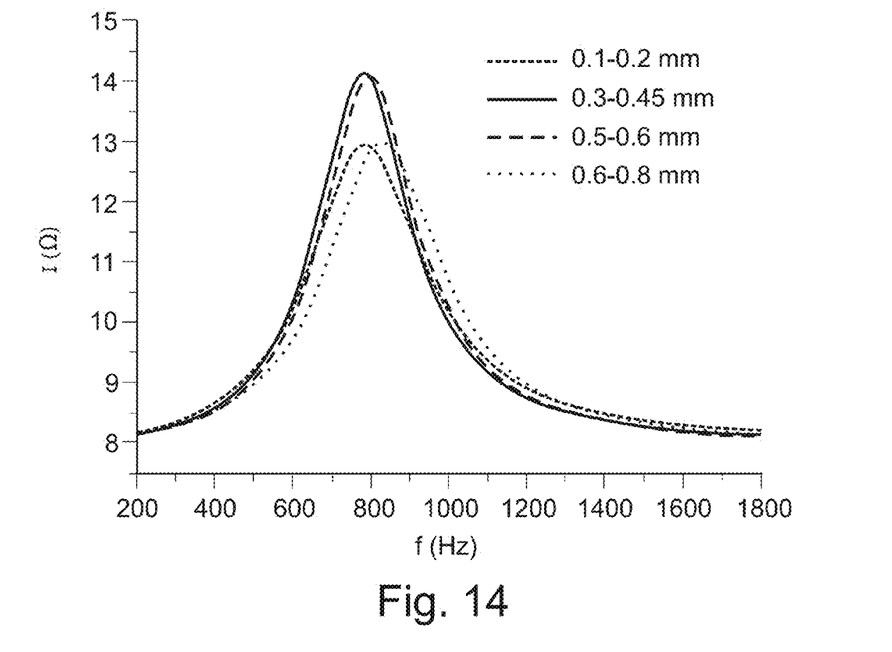
FIG. 14 shows electrical impedance curves for different grain sizes of zeolite material in accordance with embodiments of the herein disclosed subject matter.

According to an embodiment, the individual constituents of the zeolite material, referred to as grains herein, have a diameter between 0.1 mm and 0.9 mm and include a plurality of zeolite particles (see FIG. 4 and FIG. 5 above). According to a further embodiment, the grains have a diameter in the range of 0.4 mm and 0.7 mm. For example, the above referenced zeolite material with increased macropore fraction has a grain size of 0.3 mm. For investigating the influence of the grain size, different grain size fractions have been taken with respective sieves and electrical impedance spectra of these materials have been taken. FIG. 14 shows the measured spectra (impedance I in Ohm over frequency f in Hertz). The respective grain diameters for the individual curves in FIG. 14 are given in mm. As is apparent from FIG. 14, for a grain diameter of 0.6 mm as well as below a grain diameter of 0.3 mm, the frequency shift of the resonance maximum is smaller and the damping is higher as for grain diameters in a range of 0.3 mm to 0.6 mm.

A grain size below 0.1 mm results in an undesirable movement of the grains in the loudspeaker which may result in non-linear distortions of the sound. For grain diameters larger than 0.9 mm the acoustic resistance undesirably increases.

Figure 15:
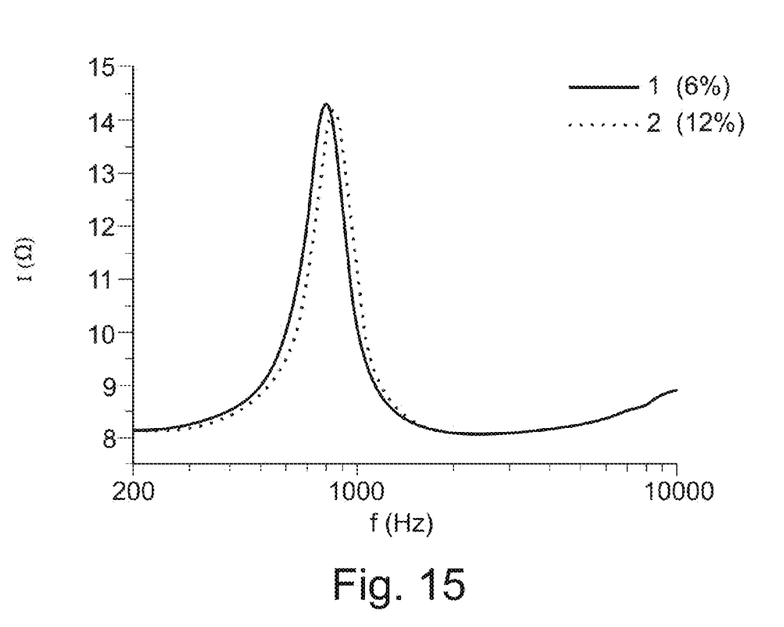
FIG. 15 shows electrical impedance curves for zeolite materials with different polymer content in accordance with embodiments of the herein disclosed subject matter.

According to a further embodiment of the herein disclosed subject-matter, the sorber material contains less than 20% binder (polymer material). According to a further embodiment, the sorber material contains less than 10% binder. According to a further embodiment, the sorber material contains at least 1% binder. The binder glues the zeolite primary particles together. It has turned out in the experiments that for polymer fractions larger than 10% (in the solid-state), the virtual acoustic volume enlargement that is achieved by introducing the material in the resonance space of the loudspeaker device is below 1.5. For polymer concentrations below 4% (again related to the whole mass in the solid-state (mass of polymer/whole mass)), the resulting material is instable and shows heavy abrasion. FIG. 15 shows electrical impedance (I) curves of materials with different polymer concentrations over frequency f. The materials used for the spectra in FIG. 15 include zeolite particles of the zeolite with the increased macropore fraction obtained as described above (curve 1 in FIG. 11). Curve 1 of FIG. 15 is obtained for the zeolite material with 6% polymer and curve 2 of FIG. 15 is obtained for the zeolite material with 12% polymer. As is apparent from FIG. 15, the higher polymer content leads to a smaller shift of the resonance frequency towards lower frequencies.

Figure 16:
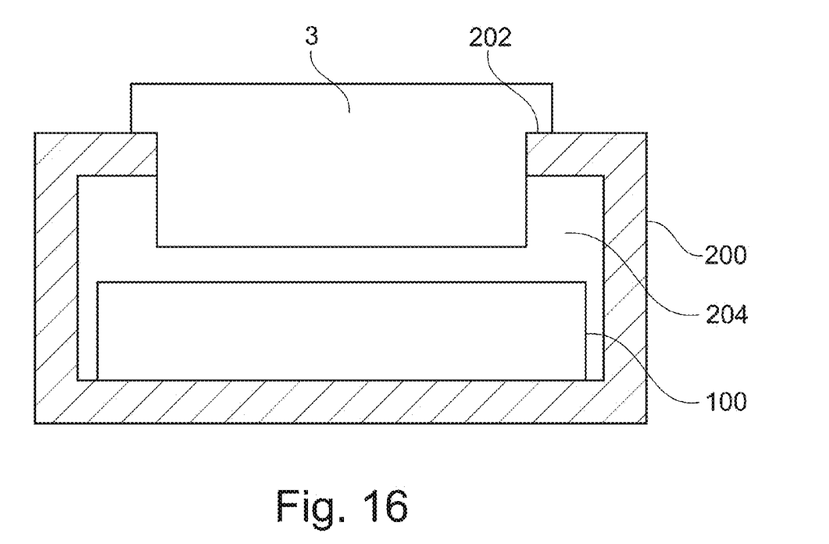
FIG. 16 shows a loudspeaker device in accordance with embodiments of the herein disclosed subject matter.

FIG. 16 shows a loudspeaker device 200 in accordance with embodiments of the herein disclosed subject matter. The loudspeaker device 200 comprises a loudspeaker receptacle 202 for receiving a loudspeaker 3. Further, the loudspeaker device 200 comprises a zeolite material 100 according to aspects and embodiments of the herein disclosed subject matter in a region 204, e.g. a resonance space, that is exposed to sound generated by the loudspeaker 3 of the loudspeaker device 200.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

A loudspeaker device is presented which includes a zeolite material comprising zeolite particles having a silicon to aluminum mass ratio of at least 200. For an increased pore fraction of pores with a diameter in a range between 0.7 micrometer and 30 micrometer shows an increased shift of the resonance frequency down to lower frequencies has been observed.

LIST OF REFERENCE SIGNS 2 signal source
4 sealing
3 loudspeaker
5 closed volume
6 audio output port
7 soundcard
8 left line input port
9 right line input port
10 resistance
11 left output port
12 soundcard
14 left input
15 microphone
30 impedance measuring circuit
40 impedance response measuring circuit
50 setup for sound pressure level measurement
100 zeolite material
102 zeolite particle
104 first pore within zeolite particle
106 second pore between zeolite particles
108 grain
200 loudspeaker device
202 loudspeaker receptacle

What is claimed is:

1. A zeolite particle comprising silicon dioxide and aluminum constituents, wherein the silicon to aluminum mass ratio is at least 200, and wherein the zeolite particle changes the acoustic compliance of gas contained within a substantially closed volume based on acoustic pressure.

2. The zeolite particle according to claim 1, wherein the zeolite particle has a diameter that is less than 10 micrometers.

3. The zeolite particle according to claim 1, wherein the zeolite particle has a diameter that is greater than 0.1 micrometers.

4. The zeolite particle according to claim 1, wherein the zeolite particle comprises a plurality of micropores, and the micropores have pore diameters between 0.4 nanometers and 0.7 nanometers.

5. The zeolite particle according to claim 1, wherein the zeolite particle has the structure FER.

6. The zeolite particle according to claim 1, wherein the zeolite particle has the structure MFI.

7. The zeolite particle according to claim 1, wherein the zeolite particle is hydrophobic.

8. The zeolite particle according to claim 1, wherein the zeolite particle has one of the structures CHA, IHW, IWV, ITE, UTL, VET, or MTW.

9. The zeolite particle according to claim 1, wherein the zeolite particle is electrically insulating, and non-corrosive to metal.

10. An acoustic element for placement in a back volume of an acoustic device, the acoustic element comprising a plurality of zeolite particles having silicon dioxide and aluminum constituents, wherein the silicon to aluminum mass ratio is at least 200, and wherein the acoustic element, when exposed to acoustic pressure within the back volume of the loudspeaker device, changes the acoustic compliance of gases contained within the back volume of the acoustic device.

11. The acoustic element according to claim 10, wherein the acoustic element comprises zeolite particles having the structure FER.

12. The acoustic element according to claim 10, wherein the acoustic element comprises zeolite particles having the structure MFI.

13. The acoustic element according to claim 10, wherein the acoustic element comprises zeolite particles having the structure MFI and the structure FER.

14. The acoustic element according to claim 10, wherein the acoustic element comprises zeolite particles having a mean diameter less than 10 micrometers and greater than 0.1 micrometers.

15. The acoustic element according to claim 10, wherein the acoustic element comprises zeolite particles having a plurality of micropores, and the micropores have pore diameters between 0.4 nanometers and 0.7 nanometers.

16. The acoustic element according to claim 10, wherein the acoustic element comprises zeolite particles that are hydrophobic, are electrically insulating, and are non-corrosive.

17. A zeolite particle for adsorbing and desorbing a gas medium contained within a substantially closed volume, the zeolite particle comprising silicon dioxide and aluminum constituents, wherein the silicon to aluminum mass ratio is at least 200, and wherein the zeolite particle adsorbs and desorbs the gas medium based on acoustic pressure.

18. The zeolite particle according to claim 17, wherein the zeolite particle has a mean diameter that is less than 10 micrometers and greater than 0.1 micrometers.

19. The zeolite particle according to claim 18, wherein the zeolite particle comprises a plurality of micropores, and the micropores have pore diameters between 0.4 nanometers and 0.7 nanometers.

20. The zeolite particle according to claim 17, wherein the zeolite particle has the structure FER.

21. The zeolite particle according to claim 17, wherein the zeolite particle has the structure MFI.

22. The zeolite particle according to claim 17, wherein the zeolite particle has one of the structures CHA, IHW, IWV, ITE, UTL, VET, or MTW.

23. The zeolite particle according to claim 17, wherein the zeolite particle is hydrophobic, is electrically insulating, and is non-corrosive.

24. The zeolite particle according to claim 17, wherein the zeolite particle has a high sorption capacity for nitrogen gas in the medium and a high sorption coefficient at approximately one atmosphere of pressure.

25. The zeolite particle according to claim 17, wherein the zeolite particle do not undergo a substantial degradation of sorption capacity for nitrogen gas in the medium on a per volume unit basis at one atmosphere of pressure.

26. A zeolite particle for adsorbing and desorbing gas within a substantially closed volume, the zeolite particle comprising silicon dioxide and aluminum constituents in a predetermined silicon to aluminum mass ratio, wherein the zeolite particle has a mean diameter that is less than 10 micrometers and greater than 0.1 micrometers, wherein the zeolite particle comprises a plurality of micropores with pore diameters between 0.4 nanometers and 0.7 nanometers, and wherein the zeolite particle is hydrophobic, non-corrosive, and electrically insulating.

27. The zeolite particle according to claim 26, wherein the predetermined silicon to aluminum mass ratio is at least 200.

28. The zeolite particle according to claim 26, wherein the predetermined silicon to aluminum mass ratio is at least 300.

29. The zeolite particle according to claim 26, wherein the zeolite particle has the structure FER.

30. The zeolite particle according to claim 26, wherein the zeolite particle has the structure MFI.

31. The zeolite particle according to claim 26, wherein the zeolite particle do not undergo a substantial degradation of sorption capacity for nitrogen gas on a per volume unit basis at one atmosphere of pressure.

32. The zeolite particle according to claim 26, wherein the zeolite particle changes the acoustic compliance of the gas contained within the substantially closed volume.

33. A loudspeaker device comprising:
a loudspeaker housing comprising a back volume and a mounting port for a loudspeaker;
a loudspeaker disposed in the mounting port, wherein a portion of the loudspeaker is acoustically coupled to the back volume; and
an acoustic element disposed in the back volume, wherein the acoustic element comprises a plurality of zeolite particles according to claim 26.

* * * * *